US 6,718,168 B2

(12) United States Patent
Ala-Luukko et al.

(10) Patent No.: US 6,718,168 B2
(45) Date of Patent: Apr. 6, 2004

(54) TRANSMISSION OF MULTIMEDIA MESSAGES BETWEEN MOBILE STATION TERMINALS

(75) Inventors: Sami Ala-Luukko, Helsinki (FI); Jussi Koski, Helsinki (FI)

(73) Assignee: TeliaSonera Finland OYJ, Helsinki (FI)

( * ) Notice: Subject to any disclaimer, the term of this patent is extended or adjusted under 35 U.S.C. 154(b) by 149 days.

(21) Appl. No.: 10/135,161

(22) Filed: Apr. 30, 2002

(65) Prior Publication Data
US 2003/0064706 A1 Apr. 3, 2003

Related U.S. Application Data

(63) Continuation of application No. PCT/FI00/00969, filed on Nov. 6, 2000.

(51) Int. Cl.[7] .............................................. H04M 11/00
(52) U.S. Cl. ........................ 455/412.1; 455/412.2; 455/413; 455/414.4
(58) Field of Search ................... 455/412.1, 412.2, 455/414.1, 413, 414.4, 433, 517, 560, 403, 428, 445, 514; 709/206, 219; 370/254, 259, 356, 389, 487, 352; 379/67.1, 68, 88.11, 88.12, 88.13

(56) References Cited

U.S. PATENT DOCUMENTS

| 5,706,211 A | | 1/1998 | Beletic et al. | |
|---|---|---|---|---|
| 5,724,407 A | * | 3/1998 | Bruno et al. | 379/88.13 |
| 5,742,905 A | | 4/1998 | Pepe et al. | |
| 5,751,791 A | * | 5/1998 | Chen et al. | 379/88.13 |
| 5,974,449 A | | 10/1999 | Chang et al. | |
| 6,195,345 B1 | * | 2/2001 | Kramer | 370/352 |
| 6,333,919 B2 | * | 12/2001 | Gaffney | 370/254 |
| 6,421,707 B1 | * | 7/2002 | Miller et al. | 709/206 |
| 6,438,114 B1 | * | 8/2002 | Womack et al. | 370/329 |
| 6,600,732 B1 | * | 7/2003 | Sevanto et al. | 370/349 |
| 2002/0132608 A1 | * | 9/2002 | Shinohara | 455/412 |

FOREIGN PATENT DOCUMENTS

| EP | 0 817 443 A2 | 1/1998 |
|---|---|---|
| WO | WO 97/08906 | 3/1997 |
| WO | WO 98/19438 | 5/1998 |
| WO | WO 99/56445 | 11/1999 |
| WO | WO 99/61966 | * 12/1999 |

* cited by examiner

Primary Examiner—Sonny Trinh
(74) Attorney, Agent, or Firm—Cohen, Pontani, Lieberman & Pavane

(57) ABSTRACT

A method and a system for transmitting messages containing multimedia information or content that enables transmission and communication of multimedia messages between subscribers connected to telecommunication systems of different system operators. The inventive system includes a first mobile station terminal from which a multimedia message is sent, a second mobile station terminal that is the intended recipient of the multimedia message, a digital mobile network, a first multimedia message server for receiving a multimedia message from the first mobile station terminal, a first address database associated with the first multimedia message server, a second multimedia message server for receiving the multimedia message from the first multimedia message server, an IP network for carrying communications between the first and second multimedia message servers, and a second address database associated with the second multimedia message server.

16 Claims, 2 Drawing Sheets

TRANSMISSION OF MULTIMEDIA MESSAGES BETWEEN MOBILE STATION TERMINALS

This application is a continuation of PCT/FI00/00969 filed Nov. 6, 2000.

BACKGROUND OF THE INVENTION

1. Field of the Invention

The present invention generally relates to telecommunications. In particular, the invention is directed to methods and apparatus for transmitting messages containing multimedia information or content between mobile station communication terminals.

2. Description of Related Art

The use of short messages for effecting communication between mobile stations of wireless telecommunication networks has become extremely common among wireless network subscribers over the past several years. Each such short message can have a maximum length of up to 160 characters. The transmission of short messages does not require that the mobile station be switched on since, if the mobile station cannot be reached at the time that the short message is sent, the message is saved to the short message service centre. The short message service centre retains the saved message for a period of several days and, when the mobile station to which the message has been directed is activated within the access range of the mobile network, the saved message is then transmitted to the activated mobile station. Such short messages may be transmitted either within the range or boundaries of the same cell or to other cells by means of the standard roaming features of mobile stations. Today these short messages are most typically, although not exclusively, transmitted in GSM (i.e. Global System for Mobile Communications) networks.

As is known, short messages may currently only be used for sending text-form, i.e. plaintext, messages. By virtue of the rapid development of technology, however, consumers will in the near future demand and be offered the ability to send and receive multimedia short messages consisting of a variety of different media components. But multimedia messages have not heretofore been standardized in any effective manner, so that whatever solutions are offered are likely to be operator and/or device-manufacturer specific. This will either in effect prevent the transmission of multimedia messages between the mobile stations of or serviced or supported by different system operators or manufacturers, or alternatively require the use of difficult and expensive implementations to enable such transmissions.

OBJECTS AND SUMMARY OF THE INVENTION

It is accordingly the desideratum of the present invention to provide methods and apparatus that eliminate, or at least significantly alleviate, the difficulties and drawbacks of the prior art, including those described hereinabove.

It is a particular object of the invention to provide a method and a system that enable the ready transmission of messages containing multimedia information or content between different telecommunication system operators or providers.

Broadly described, in the present invention a multimedia message is created and transmitted in a telecommunication network. The created multimedia message is sent from the first mobile station terminal, the sent message from the first terminal is further transmitted onward toward its ultimate destination (such as a second mobile station terminal), a notification informing of the multimedia message that has been sent is transmitted to the intended recipient second mobile station terminal, and the multimedia message is retrieved by and onto the second mobile station terminal device. As used herein, the term "multimedia message" is intended to denote a message which advantageously consists of or includes a plurality of different media components or content, such as an image, voice, text and/or graphics.

More particularly, and in accordance with the invention, a multimedia message addressed to an intended recipient is sent from the first mobile station terminal of the initiating sender to a first multimedia message server (with which the first mobile station is at least then associated) using the mobile communication network. The sent multimedia message is received by and saved on the first multimedia message server in the mailbox of the sender. If necessary, address information of a second multimedia message server (with which the second mobile station terminal of the intended recipient is associated) is located or identified using a first address database associated with or accessible by the first multimedia message server. An e-mail message based on the saved multimedia message is then created, and the created e-mail message is transmitted from the first multimedia message server to the second multimedia message server using an IP (Internet Protocol) network. A multimedia message based on the received e-mail message is then created using the second multimedia message server and is saved on the second multimedia message server in the mailbox of the intended second mobile terminal recipient; if necessary, the address of the second terminal device can be located or identified using a second address database associated with or accessible by the second multimedia message server. A notification informing the intended recipient of the multimedia message that has been stored by the second multimedia message server is then sent from the second multimedia message server to the second terminal device using the mobile communication network. If necessary—such as where the intended recipient of them message has no mailbox on the second multimedia message server—the multimedia message may be created or stored in a mailbox of its own on the second multimedia message server. Multimedia message servers may be implemented as separate units, or integrated with already-existing network components, as for example short message servers. The invention may be applied, by way of illustration, to a digital mobile network such as a GSM network, and the IP network may for example be any telecommunication network that utilizes or supports the IP protocol, such as the public Internet network.

In one or more embodiments of the invention, the e-mail message based on the multimedia message content may be created by coding the multimedia message content into an e-mail message in MIME format, as for example so that the text portion of the content serves as the plaintext message body and other portions of the multimedia message content are sent as one or more attachments to the text portion. MIME (Multipurpose Internet Mail Extensions) format, as is well known, permits the combining and transmission of attachments to typically text-based e-mail messages.

In some embodiments of the invention, information that correlates the DNS (Domain Name Server) addresses and MSISDN (Mobile Subscriber ISDN) numbers of multimedia message servers of the network(s) is maintained in the first address database.

Similarly, information that correlates the MSISDN numbers and e-mail addresses of subscribers associated with or served by the second multimedia message server may be maintained in the second address database.

It is also contemplated that, in some embodiments of the invention, the multimedia message may be sent from the originating first mobile station terminal using a browser-type user interface that is incorporated or accessible in the terminal device of the initiating or sending subscriber. Such a browser-type user interface may advantageously been implemented using WAP (Wireless Access Protocol) technology.

The multimedia message may similarly be retrieved on the second mobile station terminal of the destination or receiving subscriber using a browser-type user interface incorporated or accessible in the second terminal device. This browser-type user interface may likewise be advantageously implemented using WAP technology.

In some embodiments of the invention, the e-mail to be transmitted is first encrypted, for which purpose any suitable encrypting device or application, and any convenient encryption scheme such as the well-known PGP (Pretty Good Privacy) system, may be used. The e-mail message may also be transmitted using SMTP (Simple Message Transfer Protocol).

It is further contemplated that, in some embodiments, a billing ticket based on the multimedia message may be generated.

As compared with prior art methods and systems, the present invention renders it advantageously possible to send multimedia messages between the systems and mobile stations and subscribers of different telecommunication system operators. Since the invention utilizes existing, well-known and widely-available e-mail practices, it is particularly easy to implement and to expand its use throughout and among telecommunication systems. Moreover, the inventive methods and apparatus can utilize the public Internet and thus do not require the design or construction of dedicated connections between the multiple multimedia message servers. The optional use of encryption further assures that information security is not endangered.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE CURRENTLY PREFERRED EMBODIMENTS

Figure 1:
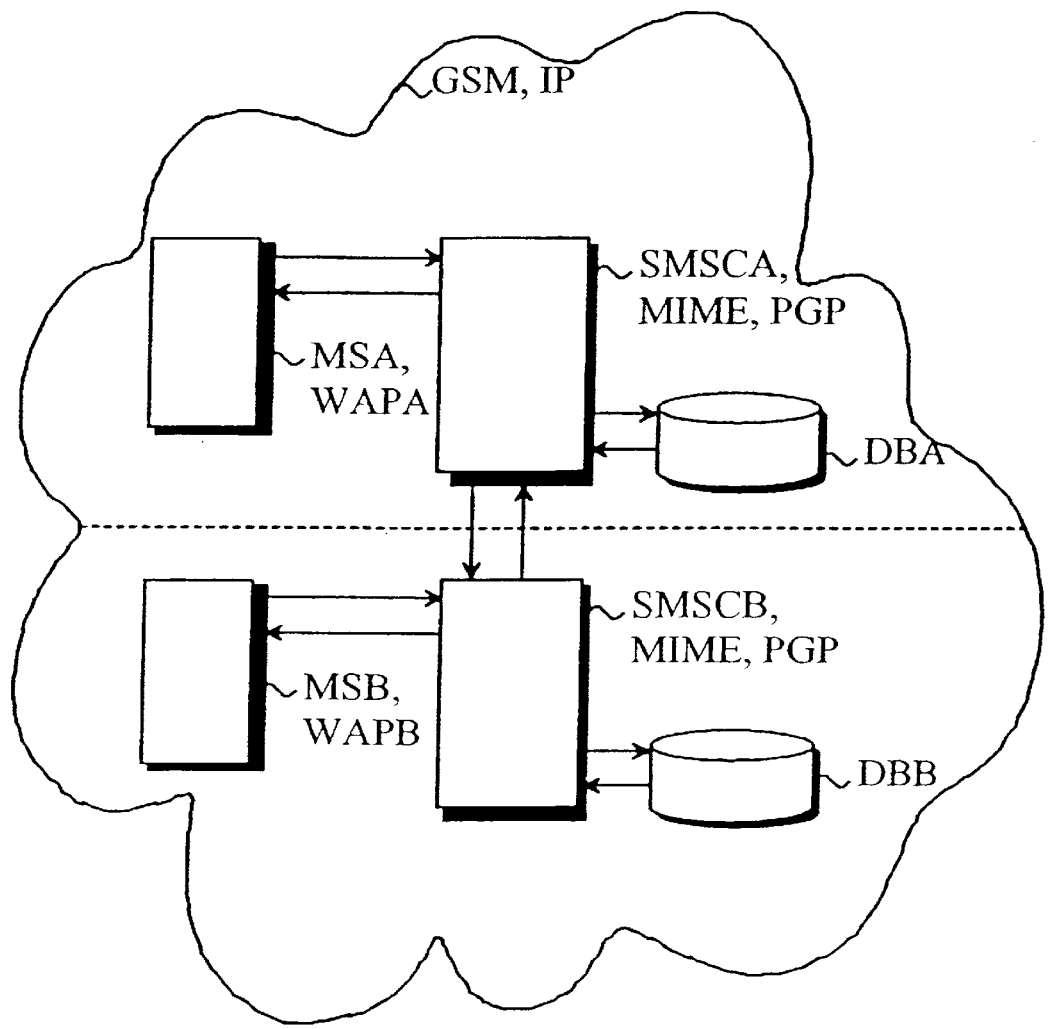
FIG. 1 is a schematic block diagram of a system constructed and arranged for the transmission of multimedia messages in accordance with the present invention.

FIG. 1 is a block diagram depicting, by way of example, the components of an illustrative system configured in accordance with the present invention. As seen in FIG. 1, the system comprises an originating first mobile station terminal MSA from which the multimedia message is sent, an intended recipient second mobile station terminal MSB to which the multimedia message is directed and by which it is ultimately received, and a digital mobile network GSM. The inventive system further includes a first multimedia message server SMSCA operable for receiving and saving the multimedia message from the first mobile station terminal MSA, for transforming the received message into an e-mail message, and for sending the transformed e-mail message to a second multimedia message server SMSCB; a first address database DBA for maintaining address information for the multimedia message servers and which is arranged as a part of, or for association with or access by or otherwise in conjunction with the first multimedia message server SMSCA; an Internet Protocol network IP for transmitting the e-mail message from the first multimedia message server SMSCA to a second multimedia message server SMSCB; the second multimedia message server SMSCB for transforming (or re-transforming) the e-mail message received from the first multimedia message server SMSCA into a multimedia message, for saving the transformed multimedia message and for sending a notification of receipt to the second terminal device MSB of the multimedia message that it has received and stored for eventual transmission to the second terminal device MSB; and a second address database DBB for maintaining address information for mobile subscribers associated with the second multimedia message server SMSCB and arranged as a part of, or for association with or access by or otherwise in conjunction with the second multimedia message server SMSCB. In addition, the FIG. 1 system of the invention comprises a coder MIME for encoding the multimedia message into an e-mail message in MIME format, and an encrypter or encrypting device or application PGP for encrypting the e-mail message to be transmitted by the first multimedia message server SMSCA to the second multimedia message server SMSCB. The first mobile station terminal MSA may include a browser-type user interface WAPA, and the second mobile station terminal MSB may similarly include a browser-type user interface WAPB.

Figure 2:
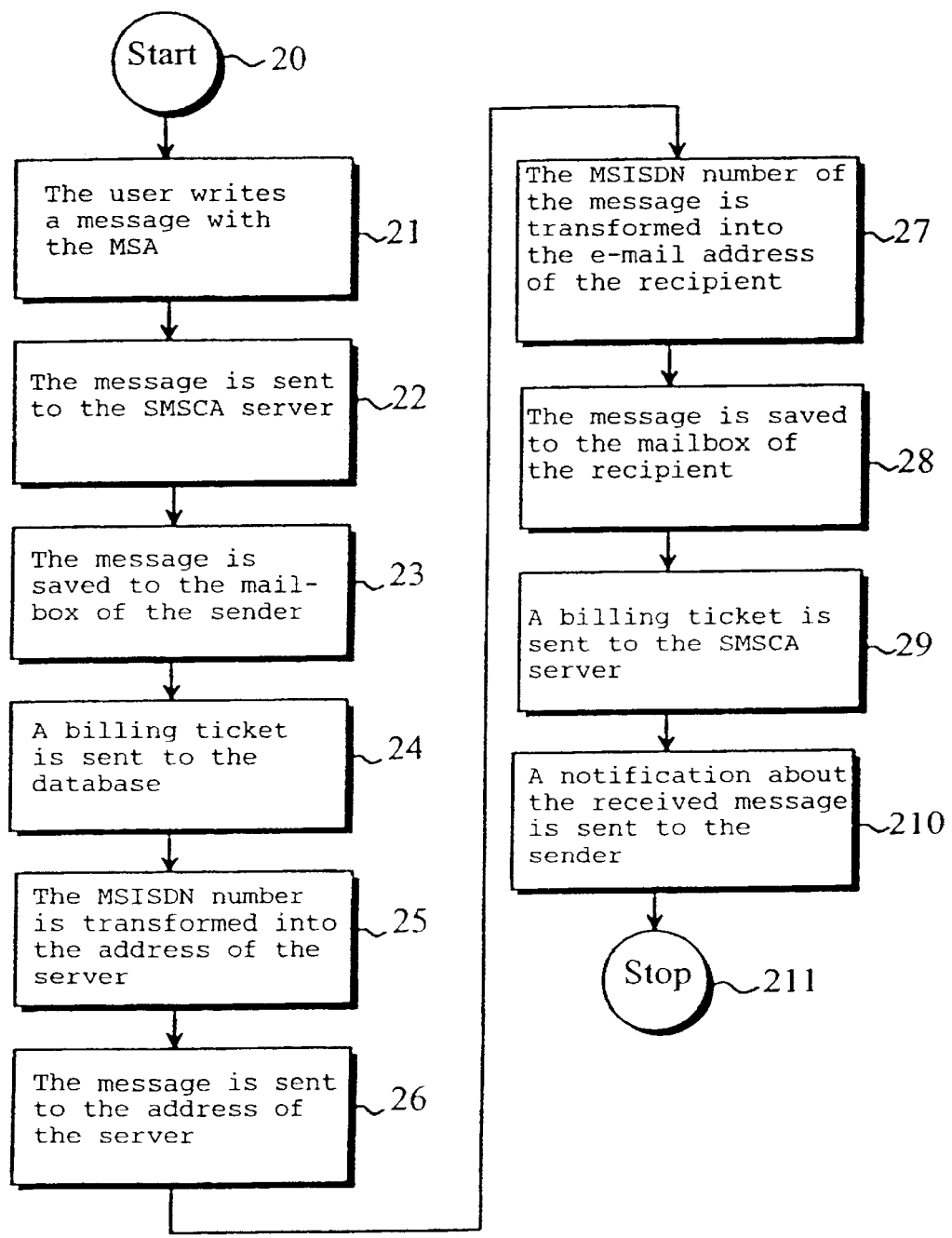
FIG. 2 is a flow chart of a method for the transmission of multimedia messages in accordance with the invention.

The flow chart of FIG. 2 depicts, by way of example, a method in accordance with the present invention for sending a multimedia short message between two different telecommunication systems operators via an IP network. Initially, the user of the originating first mobile station terminal writes or creates a short message (block 21), and the short message is transmitted from the first mobile station terminal to the first short message service centre or server (block 22). In the short message service centre, the short message is temporarily saved to the mailbox of the sender (block 23), and a billing ticket is sent to the database (block 24). The destination address of the short message may for example be of the form +358400123456@mmm.operator.com. and, based on the designated country code and operator code, i.e. +358400 in this example, the e-mail server of the intended recipient is identified (block 25). To identify or correlate the country code, operator code and address of the e-mail server, a database is maintained in or otherwise associated with or accessible by the first short message service centre. The message is transmitted via the IP network to the server of (i.e. associated with) the intended recipient (block 26). During the period of the data transfer, multimedia information in the message is coded by a multipurpose Internet mail extension (i.e. MIME) and, to effect the transfer, a simple message transfer protocol (i.e. STMP) is employed. The specified destination address of the message is further examined at the receiving server, which is itself provided or associated with a database by which the specified address (+358400123456@mmm.operator.com) of the message can be transformed into an e-mail message address format identifying the intended recipient, such as FirstName.FamilyName@mmm.operator.com (block 27). The message is then saved to the electronic mailbox of the recipient (block 28); if however there is no electronic mailbox for the recipient, then a new electronic mailbox is created. A billing ticket, based on the message that is transmitted to the server that sent the message, is created (block 29), and the intended recipient of the message is then sent the entire message or a part of the message (block 210). The message transmission type is selected based on the available features of the terminal device of the recipient and the network.

While there have been shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same result are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of transmitting a multimedia message from a first mobile station terminal of a sender to a second mobile station terminal of an intended recipient of the multimedia message, comprising the steps of:

transmitting the multimedia message from the first mobile station terminal to a first multimedia message server that receives the multimedia message from the first mobile station terminal via a mobile telecommunication network;

saving the received multimedia message on the first multimedia message server in a mailbox of the sender;

identifying, from the received multimedia message, address information of a second multimedia message server, optionally by utilizing a first database associated with the first multimedia message server;

creating, at the first multimedia message server, an e-mail message based on the received multimedia message;

transmitting the created e-mail message from the first multimedia message server to the second multimedia message server for receipt by the second multimedia message server;

creating a new multimedia message based on the e-mail message received by the second multimedia message server;

saving the created new multimedia message on the second multimedia message server in a mailbox of the recipient;

identifying, at the second multimedia message server, address information of the second mobile station terminal, optionally by utilizing a second database associated with the second multimedia message server; and sending, from the second multimedia message server to the second mobile station terminal via the mobile communication network, a notification of the new multimedia message that has been saved by the second multimedia message server.

2. The method of claim 1, wherein said step of creating an e-mail message further comprises creating an e-mail message based on the multimedia message by coding the multimedia message into an e-mail message in MIME format.

3. The method of claim 1, wherein the first database comprises a first address database containing information correlating DNS addresses and MSISDN numbers of the first and second multimedia message servers.

4. The method of claim 1, wherein the second database comprises a second address database correlating MSISDN numbers and e-mail addresses of mobile subscribers associated with the second multimedia message server.

5. The method of claim 1, wherein said step of transmitting the multimedia message from the first mobile station terminal further comprises transmitting the multimedia message using a browser-type interface in the first mobile station terminal.

6. The method of claim 1, further comprising the step of retrieving the new multimedia message from the second multimedia message server onto the second mobile station terminal using a browser-type user interface in the second mobile station terminal.

7. The method of claim 1, further comprising the step of encrypting the created e-mail message to be transmitted to the second multimedia message server.

8. The method of claim 1, wherein said step of transmitting the created e-mail message from the first multimedia message server to the second multimedia message server further comprises transmitting the created e-mail message using SMTP protocol.

9. The method of claim 1, further comprising the step of generating a billing ticket based on the multimedia message.

10. A system for transmitting a multimedia message in a telecommunication network from a first mobile station terminal of a sender to a second mobile station terminal of an intended recipient of the multimedia message, said system comprising:

a second multimedia message server;

a first multimedia message server operable for receiving the multimedia message from the first mobile station terminal, for saving the received multimedia message, for transforming the received multimedia message into an e-mail message and for sending the e-mail message to the second multimedia message server;

a first address database associated with the first multimedia message server for maintaining address information of plural multimedia message servers of the telecommunication network;

an IP network for transmitting the e-mail message from the first multimedia message server to the second multimedia message server;

said second multimedia message server being operable for receiving the e-mail message from the first multimedia message server, for transforming the received e-mail message into a new multimedia message, for saving the new multimedia message and for sending to the second mobile station terminal a notification of the saved new multimedia message; and a second address database associated with the second multimedia message server for maintaining address information of subscribers associated with the second multimedia message server.

11. The system of claim 10, further comprising a coder for coding the received multimedia message into MIME format.

12. The system of claim 10, wherein the first address database contains information correlating DNS addresses and MSISDN numbers of the plural multimedia message severs.

13. The system of claim 10, wherein the second address database contains information correlating MSISDN numbers and e-mail addresses of subscribers associated with the second multimedia message server.

14. The system of claim 10, wherein the first mobile station terminal includes a browser-type user interface.

15. The system of claim 10, wherein the second mobile station terminal includes a browser-type user interface.

16. The system of claim 10, further comprising an encrypter for encrypting the e-mail message to be sent from the first multimedia message server to the second multimedia message server.

* * * * *